United States Patent [19]

Gruber

[11] 4,424,331

[45] Jan. 3, 1984

[54] STABLE, ANAEROBICALLY-HARDENING ADHESIVES CONTAINING MIXED AMINE OXIDE/HN-ACIDIC COMPOUND INITIATORS

[75] Inventor: Werner Gruber, Korschenbroich, Fed. Rep. of Germany

[73] Assignee: Henkel Kommanditgesellschaft auf Aktien, Dusseldorf-Holthausen, Fed. Rep. of Germany

[21] Appl. No.: 349,837

[22] Filed: Feb. 18, 1982

[30] Foreign Application Priority Data

Mar. 21, 1981 [DE] Fed. Rep. of Germany ....... 3111132

[51] Int. Cl.$^3$ ............................................... C08F 20/10
[52] U.S. Cl. .................................... 526/301; 428/463; 526/309; 526/313; 526/320; 526/323.1; 526/323.2
[58] Field of Search ............... 526/301, 309, 313, 320, 526/323.1, 323.2

[56] References Cited

U.S. PATENT DOCUMENTS 4,034,145 7/1977 Gruber ............................ 526/323.1

*Primary Examiner*—Harry Wong, Jr.
*Attorney, Agent, or Firm*—Hammond & Littell, Weissenberger and Muserlian

[57] ABSTRACT

A stable, anaerobically-hardening adhesive system based on polymerizable methacrylates and acrylates which are free of peroxides and hydroperoxides and harden at an accelerated rate under anaerobic conditions having, for 100 parts by weight of said polymerizable methacrylates and acrylates, from 0.2 to 5 parts by weight of at least one organic amine oxide and from 0.2 to 10 parts by weight of at least one NH-acidic compound, as an initiator. Preferred among the amine oxides are those that contain two alkyl radicals with 1 to 12 carbon atoms in addition to one aromatic radical, which can also be substituted.

1 Claim, No Drawings

STABLE, ANAEROBICALLY-HARDENING ADHESIVES CONTAINING MIXED AMINE OXIDE/HN-ACIDIC COMPOUND INITIATORS

BACKGROUND OF THE INVENTION

The present invention relates to stable, anaerobically-hardening adhesive systems based on polymerizable methacrylates and acrylates that are free of peroxides and hydroperoxides, are stable in storage, harden at an accelerated rate under anaerobic conditions and are suitable for bonding and sealing, particularly of metal surfaces.

A process is known for the preparation of adhesives based on methacrylates that are stable in storage, by heating the monomer ester with a chelating agent, benzoic acid sulfimide and a tertiary amine in the presence of an inhibitor, until the content of active oxygen is at least 25 ppm. While the process does not require constant passing of gaseous oxygen through the adhesive during its preparation, relatively long periods of time are necessary to produce suitable mixtures. Also possible is the preparation of anaerobically hardening mixtures based on methacrylates with the use of α-aminosulfones, but only the addition of dialkyl peroxides results in technically useful mixtures.

OBJECTS OF THE INVENTION

An object of the present invention is the finding of such mixtures based on (meth)acrylates that harden quickly under anaerobic conditions, contain no peroxides and are stable in storage, and produce instantly usable adhesives and sealers.

A further object of the present invention is the development of a stable, anerobically-hardening adhesive system based on polymerizable methacrylates and acrylates which are free of peroxides and hydroperoxides and harden at an accelerated rate under anaerobic conditions having, for 100 parts by weight of said polymerizable methacrylates and acrylates, from 0.2 to 5 parts by weight of at least one organic amine oxide and from 0.2 to 10 parts by weight of at least one NH-acidic compound, as an initiator.

These and other objects of the present invention will become more apparent as the description thereof proceeds.

DESCRIPTION OF THE INVENTION

The present invention relates to a stable, anaerobically-hardening adhesive system based on polymerizable methacrylates and acrylates which are free of peroxides and hydroperoxides and harden at an accelerated rate under anaerobic conditions having, for 100 parts by weight of said polymerizable methacrylates and acrylates, from 0.2 to 5 parts by weight of at least one organic amine oxide and from 0.2 to 10 parts by weight of at least one NH-acidic compound, as an initiator.

According to a preferred example, the amide oxides contain at least once the group

in which the aromatic radical can also be condensed with one or more other aromatic hydrocarbon radicals and can also be substituted, preferably by halogens and lower alkyl having from 1 to 12 carbon atoms, and

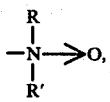

and R or R', respectively, stand for alkyl having from 1 to 12 carbon atoms.

Among the amine oxides, that of N,N-dimethylaniline amine oxide, N,N-dimethyltoluidine amine oxide, chloro-N,N-dimethylaniline amine oxide, as well as N,N-dimethylnaphthylamine amine oxide are preferred for practical considerations. But the amine oxides of N,N,N',N'-tetramethylphenylenediamine dioxide and similarly structured compounds are also suitable.

The amine oxides can also be used in the form of their salts, for example, with carboxylic acids such as acetic acid, formic acid, oxalic acid, tartaric acid or similar acids, if desired.

According to another advantageous example, the anaerobic systems according to the invention also contain at least one HN-acidic compound, preferably soluble in the polymerizable monomers, such as organic sulfonic acid hydrazides and/or carboxylic acid hydrazides, and/or sulfimides and/or acyl cyanamides and/or disulfonyl imides.

Suitable organic sulfonic acid hydrazides, for example, have the formula:

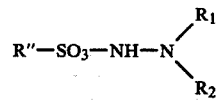

wherein R" is a member selected from the group consisting of aromatic hydrocarbon groups, aromatic hydrocarbon groups substituted by halogen and/or lower alkyl, cycloalkyl having from 5 to 10 carbon atoms and alkyl having from 8 to 22 carbon atoms, and $R_1$ and $R_2$ are, respectively, hydrogen, lower alkyl, cycloalkyl having from 5 to 10 carbon atoms and phenyl. Such compounds are primarily derived from benzenesulfonic acid, o-toluenesulfonic acid and p-toluenesulfonic acid, α-naphthalenesulfonic acid and β-naphthalenesulfonic acid, p-chlorobenzenesulfonic acid, p-bromobenzenesulfonic acid and many similar compounds. The hydrazides of cyclohexylsulfonic acids, camphorsulfonic acid, hexadecanesulfonic acid can be used as well.

Furthermore, the sulfonic acid hydrazides can be substituted at the nitrogen, for example, with alkyl groups, cycloalkyl groups or aromatic radicals, such as the phenyl radical. Examples of suitable sulfonic acid hydrazides are:
N,N-dimethyl-N'-benzenesulfonic acid hydrazide,
N-methyl-N'-benzenesulfonic acid hydrazide,
N-methyl-N'-p-toluenesulfonic acid hydrazide,
N,N-dimethyl-N'-p-toluenesulfonic acid hydrazide,
N-isopropyl-N'-p-toluenesulfonic acid hydrazide,
N-cyclohexyl-N'-p-toluenesulfonic acid hydrazide,
N,N-di-n-butyl-N'-p-toluenesulfonic acid hydrazide,
N-n-hexyl-N'-p-chlorobenzenesulfonic acid hydrazide, and
N,N-diethyl-N'-p-chlorobenzenesulfonic acid hydrazide.

Suitable carboxylic acid hydrazides are those derived from carboxylic acids, for example, those selected from the group consisting of alkanoic acids having from 2 to 18 carbon atoms, alkanedioic acids having from 2 to 18 carbon atoms, cycloalkane carboxylic acids having from 6 to 11 carbon atoms and benzene carboxylic acids, such as acetic acid, propionic acid, benzoic acid, cyclohexane carboxylic acid, cyclohexane dicarboxylic acid, succinic acid, sebacic acid, etc. Hydrazinocarbonic acid esters (NH$_2$—NH—O—COR) e.g. the tertiary butyl ester (available by Fluka, Switzerland) can also be used with good results.

o-Benzoic sulfimide is the most effective among the sulfimides.

The suitable disulfonyl imides conform to the general formula:

$$R_3—SO_2—NH—SO_2—R_4$$

in which $R_3$ and $R_4$ stand for alkyl having from 1 to 20 carbon atoms, cycloalkyl having from 5 to 10 carbon atoms, or hydrocarbon aryl and substituted hydrocarbon aryl. Suitable disulfonyl imides are derived, for example, from benzenesulfonic acid, p-chlorobenzenesulfonic acid, dichlorobenzenesulfonic acid, toluenesulfonic acid, the isomeric xylenemonosulfonic acids, α-naphthalenesulfonic acid or β-naphthalenesulfonic acid, methoxybenzenesulfonic acid or propoxybenzenesulfonic acid, diphenylsulfonic acid, cumenesulfonic acid, etc.

Suitable as acyl cyanamides are all compounds, provided that they are soluble in the monomers in adequate quantity. The following acyl cyanamides can be used: alkanoyl cyanamides having from 2 to 18 carbon atoms in the alkanoyl, such as acetyl cyanamide, propionyl cyanamide, n-butyryl cyanamide, iso-butyrylcyanamide, lauroyl cyanamide, myristoyl cyanamide, stearoyl cyanamide; benzoyl cyanamide; naphthaloyl cyanamide; toluyl cyanamide. The acyl groups may also be the nicotinyl group, phenylacetyl group, dichlorophenylacetyl group, bromoacetyl group or chloroacetyl group, p-methylphenylacetyl group, p-nitrophenylpropionyl group and 4-chloro-(bromo)-butyryl group, among others.

An organic amine can be used optionally as a supplementary accelerator together with the accelerator according to the invention. As supplementary accelerators may be mentioned N,N-dimethyltoluidine and tri-n-butylamine. They must be used only in very small amount of 0.1 or to 2.5% by weight.

The active substances to be used according to the invention can be used with basically all polymerizable monomers suitable for the preparation of so-called anaerobically-hardening adhesives and sealers.

Suitable as base for such systems are esters of acrylic acid or methacrylic acid with a variety of alcohols, such as (meth)acrylates of mono- or polyhydric alcohols, for example, alkanols having from 1 to 18 carbon atoms, such as methanol, ethanol, hexanol, decanol; alkanediols having from 2 to 18 carbon atoms, such as ethylene glycol, pentandiol; polylower alkylene glycols, such as diethylene glycol, triethylene glycol, tetraethylene glycol, polyethylene glycol, dipropylene glycol, tripropylene glycol or tetrapropylene glycol; alkanepolyols having from 3 to 8 carbon atoms and at least three hydroxyls, such as glycerin or also the reaction product of (meth)acrylic acid with dimerized or polymerized cyclopentadiene or the (meta)acrylates of tetra-hydrofurfuryl alcohol or furfuryl alcohol. Also suitable are (meth)acrylates of alcohols still containing free hydroxyl groups, such as hydroxyethyl methacrylate or glycerin monomethacrylate or glycerin dimethacrylate.

Further suitable as monomers are the dimethacrylates of bis-(ethylene glycol) adipate or bis-(ethylene glycol) maleate or bis-(ethyleneglycol-phthalate. Also the dimethacrylate of bis-(diethylene glycol) maleate, of bis-(tetra-ethylene glycol) phthalate or of bis-(triethylene glycol) sebacate are suitable as monomers.

A suitable base are also the adducts of diisocyanates with hydroxyalkyl methacrylates or aminoalkyl methacrylates. These are low molecular weight polyurethanes and polyureas with terminal methacrylate groups. The hydroxyalkyl or aminoalkyl radical can have between 2 and about 18 carbon atoms and may also be cyclic as, for example, the cyclohexyl radical. An aromatic radical instead of the alkyl radical is also possible. Worth mentioning in this connection are the reaction products of aromatic isocyanates, such as toluylene diisocyanate, diphenylmethane diisocyanate or also isophorone diisocyanate with hydroxyethyl methacrylate or hydroxypropyl methacrylate.

A suitable base for the systems according to the invention that harden at an accelerated rate under anaerobic conditions are also the methacrylates or acrylates derived by reaction of methacrylic acid or acrylic acid or their esters with diphenylol-propane. Such adducts derived from other bifunctional phenols can also be used. In many cases the mentioned bifunctional phenols are reacted with 2 to 10 mols of ethylene oxide or propylene oxide prior to the esterification with methacrylic acid or acrylic acid.

Further suitable as a base for the systems according to the invention are the dimethacrylic acid esters obtained by the reaction of half esters of diols and carboxylic acid anhydrides with glycidyl methacrylate. For the preparation of these compounds, diols, such as ethylene glycol, 1,4-butane diol, 1,6-hexane diol or hydroxystearyl alcohol, are first converted with the anhydrides of dicarboxylic acids, such as succinic acid anhydride, maleic acid anhydride or phthalic acid anhydride into the half esters. The carboxyl groups that are still free are then reacted with glycidyl methacrylate to obtain the methacrylic acid esters.

Finally, the dimethacrylates which are derived from bis-(hydroxymethyl) tricyclodecane are worth mentioning.

It is understood that these monomers generally are not used by themselves but in their mixtures, to obtain optimal strength values are hardening times. A mixture with hydroxyalkyl methacrylate was found suitable in practice.

Thickeners, plasticizers, inorganic fillers and dyes can also be added to the adhesives and sealers according to the invention. Suitable thickeners are polymers, such as polymethyl methacrylate, polyethyl acrylate, polystyrene, polyvinyl chloride, synthetic rubber and similar compounds. Suitable as fillers are, for example, finely divided silicon dioxide, silicates, bentonites, calcium carbonate, titanium dioxide, etc.

The new systems can find technical application for the bonding of sheet metal or parts of various alloys, pure metals or pretreated metallic materials, for the fastening of threads and for the sealing of pipe connections. It is also possible to accelerate the curing by known aids, for example, by applying a slight amount of heat.

The following examples are illustrative of the invention without being limitative in any manner.

EXAMPLES

The new anaerobically-hardening adhesives were tested for:
(A) Resistance to manual turning,
(B) Strength after 60 minutes and 24 hours, and
(C) Stability,
according to the following test procedures.

(A) Manual Resistance Test

For the manual resistance test, several drops of the anaerobically-hardening material were applied to the threads of a degreased brass screw (M 10×30 DIN 933) and then put together with the proper nut. From time to time, the nut was turned against the screw to determine the time from which the nut could no longer be turned manually without special effort. The time elapsed until then is regarded as measure of the manual resistance.

(B) Strength After 60 Minutes and 24 Hours

Bonded iron screws and nuts were used, after storing for 60 minutes and 24 hours at room temperature. The torque in Nm required to break the bond with a torque wrench was determined and reported.

(C) Stability

For the stability test, a test tube 10 cm in length and 10 mm in diameter was filled 9/10 full with the mixture and immersed in a bath maintained at 80° C. The time from the immersion to the first formation of gel was measured. It was above one hour in all cases of the following examples. This corresponds, according to experience, to a storage stability of more than one year at room temperature.

EXAMPLES 1 TO 5

The additives listed in Table 1 below were respectively added to 100 parts by weight of triethylene glycol dimethacrylate.
The numbers indicate parts by weight.

TABLE 1

| Additive | Example Number | | | | |
|---|---|---|---|---|---|
| | 1 | 2 | 3 | 4 | 5 |
| p-Toluenesulfonic acid hydrazide | 1 | — | — | 1 | 0.5 |
| o-Benzoic sulfimide | 1 | 1 | — | — | 0.5 |
| Benzoyl cyanamide | — | — | 1 | 1 | — |
| N,N—dimethyl-p-toluidine-N—oxide | 1 | 1 | 1 | 1 | 0.5 |

In Table 2 below, the manual resistance was recorded in minutes, and the found strength after 60 minutes and 24 hours, under the consecutive example numbers.

TABLE 2

| Curing time | Example Number | | | | |
|---|---|---|---|---|---|
| | 1 | 2 | 3 | 4 | 5 |
| Manual resistance (min) | 2 | 5 | 3 | 2 | 3 |
| 1 Hour (Nm) | 40 | 32 | 10 | 30 | 30 |
| 24 Hours (Nm) | 50 | 45 | 46 | 45 | 48 |

EXAMPLE 6 TO 9

The composition of the various mixtures according to the invention was recorded in Table 3 below. The figures below the example numbers are in parts by weight.

TABLE 3

| | Example Number | | | |
|---|---|---|---|---|
| | 6 | 7 | 8 | 9 |
| Triethylene glycol dimethacrylate | 97.5 | 98.0 | 99.0 | 98.0 |
| p-Toluenesulfonic acid hydrazide | 1.0 | 0.5 | — | 1.0 |
| o-Benzoic sulfimide | 0.5 | 0.5 | 0.5 | 0.5 |
| N,N—dimethyl-p-toluidine-N—oxide | 1.0 | 1.0 | 0.5 | 0.5 |

In Table 4 below, the curing time in minutes needed until manual resistance was reached and the torques after one and 24 hours were recorded again under the example number.

TABLE 4

| | Example Number | | | |
|---|---|---|---|---|
| | 6 | 7 | 8 | 9 |
| Manual resistance (min) | 3 | 5 | 10 | 3 |
| 1 Hour (Nm) | 40 | 30 | 30 | 35 |
| 24 Hours (Nm) | 55 | 45 | 45 | 50 |

EXAMPLES 10 TO 13

In Table 5 below, the composition of the mixtures according to the invention was recorded. The figures under the example numbers are in parts by weight.

TABLE 5

| | Example Number | | | |
|---|---|---|---|---|
| | 10 | 11 | 12 | 13 |
| Dimethacrylate of a propoxylated diphenylol propane (2.5 mols of propylene oxide) | 48 | 30 | 48 | 60 |
| Hydroxyethyl methacrylate | 48 | 68 | — | — |
| Triethylene glycol dimethacrylate | — | — | 48 | 38 |
| p-Toluenesulfonic acid hydrazide | 1 | 0.5 | 1 | 0.5 |
| o-Benzoic sulfimide | 1 | 0.5 | 1 | 0.5 |
| N,N—dimethyl-p-toluidine-N—oxide | 1 | 0.5 | 1 | 0.5 |

The curing time until the manual resistance was reached and the torques found after one and 24 hours, respectively, were recorded in Table 6 below, under the example numbers.

TABLE 6

| | Example Number | | | |
|---|---|---|---|---|
| | 10 | 11 | 12 | 13 |
| Manual resistance (min.) | 5 | 5 | 3 | 3 |
| One hour (Nm) | 40 | 30 | 41 | 32 |
| 24 Hours (Nm) | 58 | 50 | 52 | 45 |

EXAMPLES 14 TO 17

The composition of the mixtures according to the invention was recorded in Table 7 below. The figures below the example numbers are in parts by weight.

TABLE 7

| | Example Number | | | |
|---|---|---|---|---|
| | 14 | 15 | 16 | 17 |
| Dimethacrylate of dimethyloltricyclodecane | 50 | 50 | — | — |
| Diurethane from 1 mol of di- | — | — | 50 | 50 |

TABLE 7-continued

| | Example Number | | | |
|---|---|---|---|---|
| | 14 | 15 | 16 | 17 |
| phenylmethane diisocyanate and 2 mols of hydroxyethyl methacrylate | | | | |
| Hydroxyethyl methacrylate | 47 | — | 48 | — |
| Triethylene glycol dimethacrylate | — | 48 | — | 47 |
| p-Toluenesulfonic acid hydrazide | 1 | — | — | 1 |
| o-Benzoic sulfimide | 1 | 1 | 1 | 1 |
| N,N—dimethyl-p-toluidine-N—oxide | 1 | 1 | 1 | 1 |

The curing time until the manual resistance was reached and the torques found after one and 24 hours, respectively, were recorded in Table 8, under the example numbers.

TABLE 8

| | Example Number | | | |
|---|---|---|---|---|
| | 14 | 15 | 16 | 17 |
| Manual resistance (min.) | 5 | 10 | 3 | 5 |
| One hour (Nm) | 30 | 20 | 25 | 35 |
| 24 Hours (Nm) | 52 | 45 | 50 | 58 |

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A stable, anaerobically-hardening adhesive system based on polymerizable methacrylates and acrylates which are free of peroxides and hydroperoxides and harden at an accelerated rate under anaerobic conditions having, for 100 parts by weight of said polymerizable methacrylates and acrylates, from 0.2 to 5 parts by weight of at least one organic amine oxide selected from the group consisting of (1) amine oxides having the grouping;

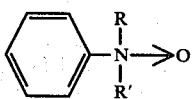

at least once and (2) amine oxides having the grouping:

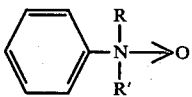

in which the aromatic radical is condensed with one or more aromatic hydrocarbon radicals and (3) amine oxides of (1) and (2) above substituted by substituents selected from the grouping consisting of halogen, alkyl having from 1 to 12 carbon atoms and

all where R and R', respectively, represent alkyl having from 1 to 12 carbon atoms, and from 0.2 to 10 parts by weight of at least one NH-acidic compound, as an initiator, selected from the group consisting of (1) organic sulfonic acid hydrazides having the formula:

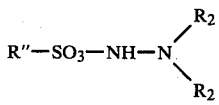

wherein R" is a member selected from the group consisting of aromatic hydrocarbon groups, aromatic hydrocarbon groups substituted by halogen and/or lower alkyl, cycloalkyl having from 5 to 10 carbon atoms and alkyl having from 8 to 22 carbon atoms, and $R_1$ and $R_2$ are, respectively, hydrogen, lower alkyl, cycloalkyl having from 5 to 10 carbon or phenyl, (2) carboxylic acid hydrazides wherein said carboxylic acids are selected from the group consisting of alkanoic acids having from 2 to 18 carbon atoms, alkanedioic acids having from 2 to 18 carbon atoms, cycloalkane carboxylic acids having from 6 to 11 carbon atoms, and benzene carboxylic acids, (3) o-benzoic sulfimide, (4) disulfonyl imides having the formula:

$$R_3-SO_2-NH-SO_2-R_4$$

in which $R_3$ and $R_4$ are members selected from the groups consisting of alkyl having from 1 to 20 carbon atoms, cycloalkyl having from 5 to 10 carbon atoms, hydrocarbon aryl, and hydrocarbon aryl having substituents selected from the group consisting of chloro, methyl, methoxy and propoxy, and (5) acyl cyanamides selected from the group consisting of alkanoyl cyanamides having from 2 to 18 carbon atoms in the alkanoyl, benzoyl cyanamide, naphthaloyl cyanamide, toluyl cyanamide, nicotinyl cyanamide, phenylacetyl cyanamide, dichlorophenylacetyl cyanamide bromoacetyl cyanamide, chloroacetyl cyanamide, p-methylphenylacetyl cyanamide, p-nitrophenylpropionyl cyanamide, 4-chloro-butyryl cyanamide and 4-bromo-butyryl cyanamide.

* * * * *